US010919808B2

United States Patent
Sang et al.

(10) Patent No.: US 10,919,808 B2
(45) Date of Patent: *Feb. 16, 2021

(54) GYPSUM COMPOSITION COMPRISING UNCOOKED STARCH HAVING MID-RANGE VISCOSITY, AND METHODS AND PRODUCTS RELATED THERETO

(71) Applicant: United States Gypsum Company, Chicago, IL (US)

(72) Inventors: Yijun Sang, Oak Park, IL (US); Brian J. Christ, Burlington, IA (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 103 days.

This patent is subject to a terminal disclaimer.

(21) Appl. No.: 15/934,088

(22) Filed: Mar. 23, 2018

(65) Prior Publication Data

US 2019/0023614 A1   Jan. 24, 2019

Related U.S. Application Data

(60) Provisional application No. 62/534,041, filed on Jul. 18, 2017.

(51) Int. Cl.

| C04B 28/14 | (2006.01) |
| C04B 24/38 | (2006.01) |
| C04B 22/16 | (2006.01) |
| E04C 2/04 | (2006.01) |
| B28B 11/14 | (2006.01) |
| B28B 11/24 | (2006.01) |
| B28B 17/02 | (2006.01) |
| C04B 111/00 | (2006.01) |

(52) U.S. Cl.
CPC .............. *C04B 28/14* (2013.01); *B28B 11/14* (2013.01); *B28B 11/243* (2013.01); *B28B 17/023* (2013.01); *C04B 22/16* (2013.01); *C04B 24/38* (2013.01); *C04B 28/145* (2013.01); *E04C 2/043* (2013.01); *C04B 2111/0062* (2013.01); *C04B 2111/00629* (2013.01)

(58) Field of Classification Search
CPC .. E04C 2/043; C04B 24/38; C04B 28/14–165
See application file for complete search history.

(56) References Cited

U.S. PATENT DOCUMENTS

| 1,769,519 A | 7/1930 | King et al. |
| 2,388,543 A | 11/1945 | Hoggatt |

(Continued)

FOREIGN PATENT DOCUMENTS

| FR | 2220639 A1 | 10/1974 |
| WO | WO 2006/122095 A2 | 11/2006 |

(Continued)

OTHER PUBLICATIONS

Sandhu et al., LWT, vol. 40, pp. 1527-1536 (Year: 2007).*

(Continued)

*Primary Examiner* — Ramsey Zacharia
(74) *Attorney, Agent, or Firm* — Greer, Burns & Crain, Ltd.; Philip T. Petti; Pradip Sahu (57) ABSTRACT

Disclosed are product (e.g., panels), slurry, and methods relating to an uncooked starch having a mid-range peak viscosity (i.e., from about 120 Brabender Units to about 900 Brabender Units).

13 Claims, 3 Drawing Sheets

(56) References Cited

U.S. PATENT DOCUMENTS

| | | | |
|---|---|---|---|
| 2,487,036 | A | 11/1949 | Wise |
| 3,414,467 | A | 12/1968 | Ferrara |
| 3,573,947 | A | 4/1971 | Kinkade et al. |
| 4,009,062 | A | 2/1977 | Long |
| 4,239,716 | A | 12/1980 | Ishida et al. |
| 4,328,178 | A | 5/1982 | Kossatz |
| 4,392,896 | A | 7/1983 | Sakakibara |
| 4,645,548 | A | 2/1987 | Take et al. |
| 5,320,677 | A | 6/1994 | Baig |
| 5,643,510 | A | 7/1997 | Sucech |
| 5,683,635 | A | 11/1997 | Sucech et al. |
| 5,817,262 | A | 10/1998 | Englert |
| 5,922,447 | A | 7/1999 | Baig |
| 6,221,151 | B1 | 4/2001 | Campbell et al. |
| 6,342,284 | B1 | 1/2002 | Yu et al. |
| 6,409,825 | B1 | 6/2002 | Yu et al. |
| 6,443,258 | B1 | 9/2002 | Putt et al. |
| 6,494,609 | B1 | 12/2002 | Wittbold et al. |
| 6,632,550 | B1 | 10/2003 | Yu et al. |
| 6,783,587 | B2 | 8/2004 | Sethuraman et al. |
| 6,815,049 | B2 | 11/2004 | Veeramasuneni et al. |
| 6,822,033 | B2 | 11/2004 | Yu et al. |
| 6,874,930 | B2 | 4/2005 | Wittbold et al. |
| 7,364,015 | B2 | 4/2008 | Englert et al. |
| 7,364,676 | B2 | 4/2008 | Sucech et al. |
| 7,413,603 | B2 | 8/2008 | Miller et al. |
| 7,851,057 | B2 | 12/2010 | Englert et al. |
| 7,862,687 | B2 | 1/2011 | Englert et al. |
| 7,875,358 | B2 | 1/2011 | Englert et al. |
| 8,070,895 | B2 | 12/2011 | Engbrecht et al. |
| 8,323,785 | B2 | 12/2012 | Yu et al. |
| 9,174,881 | B2 | 11/2015 | Cimaglio et al. |
| 10,683,235 | B2 | 6/2020 | Morlat et al. |
| 2005/0126437 | A1 * | 6/2005 | Tagge .................. C04B 24/383 106/217.01 |
| 2007/0048490 | A1 | 3/2007 | Yu et al. |
| 2007/0102237 | A1 | 5/2007 | Baig |
| 2008/0090068 | A1 | 4/2008 | Yu |
| 2009/0247937 | A1 | 10/2009 | Rontal |
| 2010/0203317 | A1 | 8/2010 | Sahay |
| 2010/0247937 | A1 | 9/2010 | Liu et al. |
| 2012/0148873 | A1 | 6/2012 | Biltresse et al. |
| 2012/0168527 | A1 | 7/2012 | Li et al. |
| 2012/0170403 | A1 | 7/2012 | Li et al. |
| 2012/0219785 | A1 | 8/2012 | Yu et al. |
| 2014/0113124 | A1 | 4/2014 | Sang et al. |
| 2015/0104629 | A1 | 4/2015 | Cao et al. |
| 2016/0230013 | A1 | 8/2016 | Englert et al. |
| 2016/0375655 | A1 | 12/2016 | Li et al. |
| 2017/0267587 | A1 | 9/2017 | Abolt et al. |
| 2017/0362124 | A1 | 12/2017 | Sang et al. |

FOREIGN PATENT DOCUMENTS

| | | | |
|---|---|---|---|
| WO | WO 2011/020528 | A1 | 2/2011 |
| WO | WO 2014/066079 | A2 | 5/2014 |
| WO | WO 2015/050804 | A1 | 4/2015 |
| WO | WO 2015/095600 | A2 | 6/2015 |

OTHER PUBLICATIONS

European Patent Office, International Search Report and the Written Opinion in International Application No. PCT/US2018/042613 (dated Oct. 17, 2018).

Burrows, "A Decade's Experience of Gypsum Board Weight Reduction in the U.S.", 14. Internationale Baustofftagung 1.0197-1.0207 (Weimar, Sep. 20-23, 2000).

Peterson, Kurt, "Engineered Gypsum Panels, the Development and Application of Densified Zones at the Paper/Core Interface of Gypsum Panels", Proceedings of Gypsum 2000, 6th International Conference on Natural and Synthetic Gypsum, Toronto, Canada, pp. 9-1-9-16 (May 2000).

\* cited by examiner

GYPSUM COMPOSITION COMPRISING UNCOOKED STARCH HAVING MID-RANGE VISCOSITY, AND METHODS AND PRODUCTS RELATED THERETO

CROSS-REFERENCE TO RELATED APPLICATION

This patent application claims the benefit of priority to U.S. Provisional Patent Application No. 62/534,041, filed Jul. 18, 2017, and entitled "GYPSUM COMPOSITION COMPRISING UNCOOKED STARCH HAVING MID-RANGE VISCOSITY, AND METHODS AND PRODUCTS RELATED THERETO," which is incorporated by reference in its entirety herein.

BACKGROUND

Set gypsum (i.e., calcium sulfate dihydrate) is a well-known material that is used in many products, including panels and other products for building construction and remodeling. One such panel (often referred to as gypsum board) is in the form of a set gypsum core sandwiched between two cover sheets (e.g., paper-faced board) and is commonly used in drywall construction of interior walls and ceilings of buildings. One or more dense layers, often referred to as "skim coats" may be included on either side of the core, usually at the paper-core interface.

During manufacture of the board, stucco (i.e., calcined gypsum in the form of calcium sulfate hemihydrate and/or calcium sulfate anhydrite), water, and other ingredients as appropriate are mixed, typically in a pin mixer as the term is used in the art. A slurry is formed and discharged from the mixer onto a moving conveyor carrying a cover sheet with one of the skim coats (if present) already applied (often upstream of the mixer). The slurry is spread over the paper (with skim coat optionally included on the paper). Another cover sheet, with or without skim coat, is applied onto the slurry to form the sandwich structure of desired thickness with the aid of, e.g., a forming plate or the like. The mixture is cast and allowed to harden to form set (i.e., rehydrated) gypsum by reaction of the calcined gypsum with water to form a matrix of crystalline hydrated gypsum (i.e., calcium sulfate dihydrate). It is the desired hydration of the calcined gypsum that enables the formation of the interlocking matrix of set gypsum crystals, thereby imparting strength to the gypsum structure in the product. Heat is required (e.g., in a kiln) to drive off the remaining free (i.e., unreacted) water to yield a dry product.

The excess water that is driven off represents an inefficiency in the system. Energy input is required to remove the water, and the manufacturing process is slowed to accommodate the drying step. However, reducing the amount of water in the system has proven to be very difficult without compromising other critical aspects of commercial product, including board weight and strength.

It will be appreciated that this background description has been created by the inventors to aid the reader, and is not to be taken as a reference to prior art nor as an indication that any of the indicated problems were themselves appreciated in the art. While the described principles can, in some regards and embodiments, alleviate the problems inherent in other systems, it will be appreciated that the scope of the protected innovation is defined by the attached claims, and not by the ability of the claimed invention to solve any specific problem noted herein.

SUMMARY

The invention relates, at least in part, to the use of an uncooked starch having a mid-range peak viscosity in various gypsum-related slurries, board, methods, and products. In accordance with embodiments of the invention, the uncooked starch of mid-range peak viscosity can be included in gypsum slurries (along with stucco, water, and other desired additives such as one or more of foam, dispersants, polyphosphates, accelerators, retarders, etc.) to enhance strength in a resulting product, e.g., gypsum board (such as in the form of wallboard, which, as used herein includes drywall used for interior wall surfaces, ceilings, partitions and the like). While not wishing to be bound by any particular theory, it is believed that uncooked starches having the mid-range viscosity as described herein allows for the starch molecules to move out of granules and thereby impart strength in the gypsum composition (e.g., containing an interlocking matrix of set gypsum) resulting from the gypsum slurry.

Advantageously, the uncooked starches of mid-range viscosity in accordance with embodiments of the invention are heavier and exhibit a higher bulk density with less variability than pregelatinized starches. In this regard, pregelatinized starches can have a high variability in bulk density, which can cause inaccurate feeding of starch into the gypsum slurry. In addition, the uncooked starch of mid-range peak viscosity advantageously can allow for a lower water demand in a gypsum wallboard manufacturing process. For example, the uncooked starch of mid-range peak viscosity can reduce water demand in a gypsum slurry by at least about 10% (e.g., at least about 20%) compared to a pregelatinized starch.

Thus, in one aspect, the invention provides gypsum board. The board comprises a set gypsum core disposed between two cover sheets, the core formed from a slurry comprising stucco, water, and at least one uncooked starch having a peak viscosity of from about 120 Brabender Units ("BU") to about 900 Brabender Units. The viscosity is measured by putting the starch in a slurry with water at a starch concentration of 15% solids, and using a Viscograph-E instrument set at 75 rpm and 700 cmg, where the starch is heated from 25° C. to 95° C. at a rate of 3° C./minute, the slurry is held at 95° C. for ten minutes, and the starch is cooled to 50° C. at a rate of −3° C./minute. The maximal viscosity is recorded as the peak viscosity.

In another aspect, the invention provides another gypsum board. The gypsum board comprises a set gypsum core disposed between two cover sheets, the core formed from a slurry comprising stucco, water, and at least one uncooked starch having a cold water viscosity of from about 1 centipoise to about 50 centipoise at 10% solids in water when the viscosity is measured by Brookfield viscometer at 25° C.

In another aspect, the invention provides a gypsum slurry (sometimes called "stucco slurry"). The slurry comprises stucco, water, and at least one uncooked starch having a peak viscosity of from about 120 Brabender Units to about 900 Brabender Units when the viscosity is measured by putting the starch in a slurry with water at a starch concentration of 15% solids, and using a Viscograph-E instrument set at 75 rpm and 700 cmg, where the starch is heated from 25° C. to 95° C. at a rate of 3° C./minute, the slurry is held at 95° C. for ten minutes, and the starch is cooled to 50° C. at a rate of −3° C./minute.

In another aspect, the invention provides another gypsum slurry. The slurry comprises stucco, water, and at least one uncooked starch having a cold water viscosity of from about 1 centipoise to about 50 centipoise at 10% of solids in water when the viscosity is measured by Brookfield viscometer at 25° C.

In another aspect, the invention provides a method of preparing gypsum board. The method comprises mixing at least water, stucco, and at least one uncooked starch having a peak viscosity of from about 120 Brabender Units to about 900 Brabender Units when the viscosity is measured by putting the starch in a slurry with water at a starch concentration of 15% solids, and using a Viscograph-E instrument set at 75 rpm and 700 cmg, where the starch is heated from 25° C. to 95° C. at a rate of 3° C./minute, the slurry is held at 95° C. for ten minutes, and the starch is cooled to 50° C. at a rate of −3° C./minute. The slurry is disposed between a first cover sheet and a second cover sheet to form a wet assembly. The wet assembly is cut into a board, and the board is dried.

In another aspect, the invention provides a method of preparing gypsum board. The method comprises mixing at least water, stucco, and at least one uncooked starch having a cold water viscosity of from about 1 centipoise to about 50 centipoise at 10% of solids in water when the viscosity is measured by Brookfield viscometer at 25° C. The slurry is disposed between a first cover sheet and a second cover sheet to form a wet assembly. The wet assembly is cut into a board, and the board is dried.

In another aspect, the invention provides an acoustical panel comprising an acoustical component comprising fiber and at least one uncooked starch having a peak viscosity of from about 120 Brabender Units to about 900 Brabender Units when the viscosity is measured by putting the starch in a slurry with water at a starch concentration of 15% solids, and using a Viscograph-E instrument set at 75 rpm and 700 cmg, where the starch is heated from 25° C. to 95° C. at a rate of 3° C./minute, the slurry is held at 95° C. for ten minutes, and the starch is cooled to 50° C. at a rate of −3° C./minute. The panel preferably has a Noise Reduction Coefficient of at least about 0.5 according to ASTM C 423-02.

In another aspect, the invention provides an acoustical panel comprising an acoustical component comprising fiber and at least one uncooked starch having a cold water viscosity of from about 1 centipoise to about 50 centipoise at 10% of solids in water when the viscosity is measured by Brookfield viscometer at 25° C. The panel preferably has a Noise Reduction Coefficient of at least about 0.5 according to ASTM C 423-02.

DETAILED DESCRIPTION

Embodiments of the present invention are premised, at least in part, on including in a gypsum slurry (sometimes called a "stucco slurry") an uncooked starch characterized as having "mid-range" peak viscosity (e.g., from about 120 Brabender Units to about 900 Brabender Units as measured according to the methodology described herein). Although the viscosity characteristic is determined as the starch is placed under certain conditions according to the viscosity measurement methodology described herein, it will be understood that the uncooked starch need not be added to the slurry under these conditions. Conventional use of non-migratory uncooked starches was undesirable with gypsum slurries because core strength was not significantly improved, although small chain migratory starches were used for enhancing paper-core bond. Embodiments of the invention unexpectedly overcome this drawback.

Surprisingly, it has been found that the inclusion of the uncooked starch of mid-range peak viscosity confers benefits such as with respect to starch efficiency (e.g., so that less starch can be used), product strength enhancements, and water demand, e.g., in unison in some embodiments. In accordance with embodiments of the invention, the benefits, including with respect to starch efficiency, water demand, and/or strength, represent a considerable improvement and advancement over non-gelatinized starches (uncooked) having viscosity below 120 Brabender Units or above 900 Brabender Units. In addition, it has been found that, surprisingly and unexpectedly, in some embodiments, the drying rate of slurries containing uncooked starch is similar to the drying rate of slurries containing pregelatinized starch. This is particularly surprising because the uncooked starch needs to absorb extra heat energy to gelatinize the starch. These discoveries impart considerable advantages, including, but not limited to, reducing cost of raw material, enhancing manufacturing efficiency, and enhancing product strength, e.g., allowing for lower weight product with sufficient strength properties.

The uncooked starch of mid-range peak viscosity can be included in a gypsum slurry for forming a board in embodiments of the invention, and can be used with gypsum board cores that optionally have a skim coat on one or both major surfaces of the core. In some embodiments, the board core formed from a gypsum slurry containing an uncooked starch can have a concentrated layer on one or both major surfaces of the core as described in commonly assigned, co-pending U.S. patent application Ser. Nos. 15/186,176; 15/186,212; 15/186,232; and Ser. No. 15/186,257, which concentrated layer arrangements are incorporated herein by reference.

Starches are classified as carbohydrates and contain two types of polysaccharides, namely linear amylose, and branched amylopectin. Starch granules are semi-crystalline, e.g., as seen under polarized light, and are insoluble at room temperatures.

The starch is uncooked in accordance with embodiments of the invention. Uncooked starches are characterized as being cold water insoluble and having a semi-crystalline structure. Typically, uncooked starches are obtained by wet milling and are not modified by heating wet starch as in the case of cooked starches. It is to be noted that the uncooked starch according to the invention is different than cooked starches, which are characterized by being cold water soluble and having a non-crystalline structure. Cooked starches are prepared by heating wet starch, and can be prepared, e.g., by extrusion techniques. See, e.g., co-pending U.S. patent application Ser. Nos. 14/494,547; 14/044,582; and Ser. No. 13/835,002. Cooked starches are sometimes referred to as pregelatinized starches, because the crystalline structure of the starch granules melts, and results in starch gelatinization, which is characterized by the disappearance of the birefringence under a microscope with a polarized light.

Preferred uncooked starches are different than acid-modified migratory starches which do not confer the same strength properties and are used in the art for paper-core bond enhancement as they migrate to the paper-core interface due to their smaller chain lengths. The acid-modified migratory starches have minimal molecular weight, typically below about 6,000 Daltons. Preferred uncooked starches in accordance with embodiments of the invention have higher molecular weights than migratory starches, e.g., at least about 15,000 Daltons. The average molecular weight is indicated by the peak viscosity. Preferred uncooked starches have a peak viscosity from about 120 BU to about 900 BU.

In some embodiments, the uncooked starch has a higher bulk density with less variability than found in pregelatinized starch. This is surprisingly useful because, for example, consistent density allows a volumetric feeder to add starch more accurately and consistently. For example, in some embodiments the bulk density can be from about 35 pcf to about 50 pcf, from about 35 pcf to about 45 pcf, from about 37 pcf to about 50 pcf, from about 37 pcf to about 45 pcf, from about 40 pcf to about 50 pcf, from about 40 pcf to about 47 pcf, from about 40 pcf to about 45 pcf, from about 41 pcf to about 45 pcf, etc.

In contrast with the uncooked starches according to the invention, gelatinization is the process in which the starch is placed in water and heated ("cooked") such that the crystalline structure of the starch granules is melted and the starch molecules dissolve in water such that a good dispersion results. It has been found that, when transforming a starch granule to gelatinized form, initially the starch granule provides little viscosity in water because starch granules are water insoluble. As the temperature increases, the starch granule swells and the crystalline structure melts at the gelatinization temperature. The peak viscosity is when the starch granule has maximum swelling. Further heating will break the starch granules and dissolve the starch molecules in water, with a precipitous dropoff in viscosity. After cooling, the starch molecule will reassociate to form a 3-D gel structure, with the viscosity increasing due to the gel structure.

The uncooked starches according to embodiments of the invention typically are in native, granular form. Peak viscosity of uncooked starches in accordance with embodiments of the invention relates to average molecular weight of starch. In accordance with some embodiments of the invention, the granular uncooked form can undergo at least some degree of gelatinization during gypsum wallboard manufacture (e.g., in the kiln).

To achieve the desired mid-range peak viscosities according to embodiments of the invention, the uncooked starch molecule can be modified, e.g., to hydrolyze glycosidic bonds between glucose units to achieve desired molecular weight. For example, such modifications can include acid modifications, enzyme modifications, and/or other methods. The most commonly used starch converting enzyme is ca-amylase (alpha-amylase). The enzyme hydrolysis reaction can be stopped either by adjusting the pH or by heating. To prepare acid-modified starches, it will be appreciated that aqueous suspension of unmodified starch can be treated with, e.g., a small quantity of acid, e.g., a strong acid such as hydrochloric acid, sulfuric acid, nitric acid, hydrofluoric acid, or the like. By adjusting reaction time, the degree of depolymerization can be modified. For example, when the proper fluidity is achieved, e.g., as determined by in-process laboratory controls, mild alkali is introduced to neutralize the acid and stop hydrolysis. Thus, acid-modified starches can be prepared in various fluidities. Also, acid-modified starches may be used directly after neutralization without further purification or may be purified to remove salts. The end use of the acid-modified starch may determine the desirability of purification. For example, a composition of starch modified by sulfuric acid and neutralized by calcium hydroxide may contain sulfate and calcium ions which could be added to a stucco and water slurry. Since the stucco has sulfate and calcium ions already, it may not be necessary to purify the sulfuric acid-modified starch prior to addition to the slurry. Thus, considerations to determine the desirability of purification include, for example, the identity of the acid and alkali base and whether it is desirable to add other ions besides sulfate or calcium ions to the slurry.

Uncooked starches exhibiting the mid-range peak viscosity characteristic according to the invention provide significant benefits to the strength of the product (e.g., wallboard). Since starch contains glucose monomers containing three hydroxy groups, starch provides many sites for hydrogen bonding to gypsum crystals. While not wishing to be bound by any particular theory, it is believed that the molecular size of the uncooked starches that exhibit the mid-range peak viscosity characteristic allows for optimal mobility of starch molecules to align starch molecules with the gypsum crystals to facilitate good binding of starch to gypsum crystals to strengthen the resulting crystalline gypsum matrix, e.g., via hydrogen bonding. Uncooked starches having viscosities outside the mid-range, which would have either longer chain lengths and higher molecular weight (viscosity that is too high) and shorter chain lengths and lower molecular weights (viscosity that is too low), respectively, do not provide the same combination of benefits. Accordingly, because of the optimal binding between gypsum crystals and the uncooked starch molecules of mid-range peak viscosity, in effect the strength of the crystalline gypsum matrix is enhanced, and less starch is required to promote that strength compared with conventional starches. Uncooked starches surprisingly and unexpectedly result in lower water demand in gypsum slurries because of the surprisingly high fluidity of the gypsum slurry containing uncooked starches.

For example, in some embodiments, the uncooked starch added to the gypsum (stucco) slurry can have a mid-range molecular weight, indicated by a peak viscosity from 120 BU to 900 BU. The mid-range viscosity of the uncooked starch is determined according to the following method. The Brabender peak viscosity is measured using a Viscograph-E (C. W. Brabender) set to 75 rpm; 700 cmg. The starch is in a slurry having a concentration of 15% solids in water. The starch slurry is heated from 25° C. to 95° C. at a rate of 3° C./min. It is then held at 95° C. for 10 min until being cooled 50° C. at a rate of −3° C./min. The peak viscosity is determined as the maximum viscosity.

The mid-range peak viscosity of the uncooked starch is generally above 100 Brabender Units and can be from about 120 Brabender Units to about 900 Brabender Units, from about 120 Brabender Units to about 875 Brabender Units, from about 120 Brabender Units to about 850 Brabender Units, from about 120 Brabender Units to about 700 Brabender Units, from about 120 Brabender Units to about 550 Brabender Units, from about 120 Brabender Units to about 460 Brabender Units, from about 120 Brabender Units to about 300 Brabender Units, from about 150 Brabender Units to about 900 Brabender Units, from about 150 Brabender Units to about 850 Brabender Units, from about 150 Brabender Units to about 750 Brabender Units, from about 150 Brabender Units to about 500 Brabender Units, from about 150 Brabender Units to about 300 Brabender Units, from about 250 Brabender Units to about 850 Brabender Units, from about 250 Brabender Units to about 600 Brabender Units, from about 250 Brabender Units to about 500 Brabender Units, from about 300 Brabender Units to about 875 Brabender Units, from about 350 Brabender Units to about 800 Brabender Units, from about 350 Brabender Units to about 750 Brabender Units, from about 400 Brabender Units to about 900 Brabender Units, from about 400 Brabender Units to about 875 Brabender Units, from about 400 Brabender Units to about 700 Brabender Units, from about 500 Brabender Units to about 850 Brabender Units, from about 500 Brabender Units to about 700 Brabender Units, from about 600 Brabender Units to about 900 Brabender Units, etc.

Properties of uncooked starches include having low viscosity in cold water (i.e., at a temperature of 77° F. (25° C.)), in contrast with properties of pregelatinized starches include having instant high viscosity in cold water. Uncooked starches according to the disclosure preferably have a cold water viscosity of about less than 50 centipoise, e.g., about 40 centipoise or less, about 30 centipoise or less, about 20 centipoise or less, or about 10 centipoise or less in cold water (e.g., from about 1 centipoise to about 50 centipoise, from about 1 centipoise to about 40 centipoise, from about 1 centipoise to about 30 centipoise, from about 1 centipoise to about 20 centipoise, from about 1 centipoise to about 10 centipoise, from about 5 centipoise to about 50 centipoise, from about 5 centipoise to about 30 centipoise, from about 5 centipoise to about 20 centipoise, from about 3 centipoise to about 15 centipoise, from about 3 centipoise to about 10 centipoise, from about 3 centipoise to about 7 centipoise, etc.). The cold water viscosity is measured according to a Brookfield viscometer method with a testing profile as follows. Starch (20 g, dry) is added into water (180 g) in a Waring blender (model 31BL92) while mixing at low speed for 15 seconds. Starch solution (200 g) is transferred into a measuring cup. No. 2 paddle and 60 RPM are selected. The viscosity value measured at 20 seconds is used as the viscosity of the starch.

Uncooked starches according to embodiments of the invention advantageously are easy to mix with water. This is because of their low viscosity in water. In contrast, pregelatinized starches can undesirably sometimes cause "fish eye," which is a condition that is characterized by one or more large lumps that form in the water solution during mixing. While not wishing to be bound by any particular theory, during the mixing process, the large lumps are believed to be caused by fast water absorption of the starch, forming a viscous film on the surface of the lump, which prevents water penetration of the lump. Uncooked starches are believed to avoid the fish eye condition because of their cold water insolubility, which results in the separation of starch granules.

Examples of suitable uncooked starches include, but are not limited to, one or more of native cereal starches, native root starches, native tuber starches, and/or chemically modified starches, with specific representative examples including, e.g., corn starch (normal, waxy, and/or high-amylose), A type wheat starch, B type wheat starch, pea starch, acid modified starches with a peak viscosity from 120 BU to 900 BU, substituted starches having substituted groups (such as acetate, phosphate, hydroxyethyl, hydroxypropyl) on starch hydroxyl groups, or any combination thereof.

Gypsum slurry is normally formed inside a pin or pinless main mixer during the manufacturing process. However, the mode of introduction of ingredients into the mixer may vary. For example, various combinations of components may be pre-mixed before entering the mixer, e.g., one or more dry ingredients and/or one or more wet ingredients may be pre-mixed. By "added to the slurry," as used herein, it will be understood that ingredients may be pre-mixed in any suitable manner prior to entry into the mixer where the gypsum (stucco) slurry is formed as set forth herein.

The uncooked starch having the mid-range peak viscosity characteristic of the invention can be included in the gypsum slurry in a wet or dry form. If in a wet form, the starch can be included in any suitable concentration, and could be pre-mixed with other wet ingredients.

As used herein, uncooked means that the starch has a degree of gelatinization of less than about 5% (e.g., less than about 3%, or less than about 1%, such as zero) before being included in the gypsum slurry. In some embodiments, the uncooked starch can be partially or fully gelatinized when exposed to elevated temperature in the gypsum wallboard manufacturing process, e.g., in the kiln for the drying step to remove excess water.

The uncooked starch having the mid-range viscosity characteristic in accordance with embodiments of the present invention surprisingly and unexpectedly can be included in the slurry in a relatively low amount (solids/solids basis) and still achieve significant strength enhancement in the board. Accordingly, in preferred embodiments of the invention, the uncooked starch having the mid-range peak viscosity characteristic is included in the gypsum slurry in an amount that is about 5% or less by weight of the stucco (e.g., from about 1% to about 4%) or even less, such as about 2% or less by weight of the stucco. For example, the uncooked starch can be included in an amount from about 0.5% to about 5% by weight of the stucco, about 0.5% to about 4% by weight of the stucco, about 1% to about 3%, about 1% to about 2%, about 1.5% to about 2%, etc.

Uncooked starches having the desired mid-range peak viscosity characteristic can be combined with other starches in accordance with embodiments of the invention. For example, the uncooked starches exhibiting the desired mid-range peak viscosity characteristic can be combined with other starches to enhance both core strength and paper-core bond, particularly if some increase in water demand is accepted. Thus, in some embodiments of the invention, gypsum slurry may include one or more uncooked starches having the mid-range viscosity characteristic, as well as one or more other types of starches. Other starches can include, for example, pregelatinized starches. Examples include pregelatinized corn starches, e.g., having a viscosity of about 773 centipoise or 100 centipoise, respectively, according to the VMA method as set forth in U.S. Patent Application Publication 2012/0113124. The other starches may also be in the form of, e.g., non-pregelatinized starches, such as migratory acid-modified starches, as well as alkylated starches, e.g., ethylated starches, that are not gelatinized, etc., which have viscosities below 120 Brabender Units or above 900 Brabender Units. The combination of starches may be pre-mixed (e.g., in a dry mix, optionally with other components such as stucco, etc., or in a wet mix with other wet ingredients) before addition to the gypsum slurry, or they can be included in the gypsum slurry one at a time, or any variation thereof. Any suitable proportion of uncooked starch having the mid-range viscosity characteristic and other starch may be included. For example, the content of uncooked starch having the mid-range viscosity characteristic as a percentage of total starch content to be added to gypsum slurry can be, e.g., at least about 10% by weight, such as at least about 20%, at least about 30%, at least about 40%, at least about 50%, at least about 60%, at least about 70%, at least about 80%, at least about 90%, at least about 95%, at least about 99%, at least about 100%, or any range in between). In exemplary embodiments, the ratio of uncooked starch having the mid-range viscosity characteristic to other starch can be about 25:75, about 30:70, about 35:65, about 50:50, about 65:35, about 70:30, about 75:25, etc.

In addition to the starch component, the slurry is formulated to include water, stucco, foaming agent (sometimes referred to simply as "foam"), and other additives as desired. The stucco can be in the form of calcium sulfate alpha hemihydrate, calcium sulfate beta hemihydrate, and/or calcium sulfate anhydrite. The stucco can be fibrous or non-fibrous. Foaming agent can be included to form an air void distribution within the continuous crystalline matrix of set gypsum. In some embodiments, the foaming agent comprises a major weight portion of unstable component, and a minor weight portion of stable component (e.g., where unstable and blend of stable/unstable are combined). The weight ratio of unstable component to stable component is effective to form an air void distribution within the set gypsum core. See, e.g., U.S. Pat. Nos. 5,643,510; 6,342,284; and 6,632,550. It has been found that suitable void distribution and wall thickness (independently) can be effective to enhance strength, especially in lower density board (e.g., below about 35 pcf). See, e.g., US 2007/0048490 and US 2008/0090068. Evaporative water voids, generally having voids of about 5 µm or less in diameter, also contribute to the total void distribution along with the aforementioned air (foam) voids. In some embodiments, the volume ratio of voids with a pore size greater than about 5 microns to the voids with a pore size of about 5 microns or less, is from about 0.5:1 to about 9:1, such as, for example, about 0.7:1 to about 9:1, about 0.8:1 to about 9:1, about 1.4:1 to about 9:1, about 1.8:1 to about 9:1, about 2.3:1 to about 9:1, about 0.7:1 to about 6:1, about 1.4:1 to about 6:1, about 1.8:1 to about 6:1, about 0.7:1 to about 4:1, about 1.4:1 to about 4:1, about 1.8:1 to about 4:1, about 0.5:1 to about 2.3:1, about 0.7:1 to about 2.3:1, about 0.8:1 to about 2.3:1, about 1.4:1 to about 2.3:1, about 1.8:1 to about 2.3:1, etc. In some embodiments, the foaming agent is present in the slurry, e.g., in an amount of less than about 0.5% by weight of the stucco such as about 0.01% to about 0.5%, about 0.01% to about 0.4%, about 0.01% to about 0.3%, about 0.01% to about 0.2%, about 0.01% to about 0.1%, about 0.02% to about 0.4%, about 0.02% to about 0.3%, about 0.02% to about 0.2%, etc.

Additives such as accelerator (e.g., wet gypsum accelerator, heat resistant accelerator, climate stabilized accelerator) and retarder are well known and can be included if desired. See, e.g., U.S. Pat. Nos. 3,573,947 and 6,409,825. In some embodiments where accelerator and/or retarder are included, the accelerator and/or retarder each can be in the gypsum slurry in an amount on a solid basis of, e.g., from about 0% to about 10% by weight of the stucco (e.g., about 0.1% to about 10%), such as, for example, from about 0% to about 5% by weight of the stucco (e.g., about 0.1% to about 5%). Other additives as desired may be included, e.g., to impart strength to enable lower weight product with sufficient strength, to avoid permanent deformation, to promote green strength, e.g., as the product is setting on the conveyor traveling down a manufacturing line, to promote fire resistance, to promote water resistance, etc.

For example, the slurry can optionally include at least one dispersant to enhance fluidity in some embodiments. Like the starch and other ingredients, the dispersants may be included in a dry form with other dry ingredients and/or in a liquid form with other liquid ingredients in the core slurry. Examples of dispersants include naphthalenesulfonates, such as polynaphthalenesulfonic acid and its salts (polynaphthalenesulfonates) and derivatives, which are condensation products of naphthalenesulfonic acids and formaldehyde; as well as polycarboxylate dispersants, such as polycarboxylic ethers, for example, PCE211, PCE111, 1641, 1641F, or PCE 2641-Type Dispersants, e.g., MELFLUX 2641F, MELFLUX 2651F, MELFLUX 1641F, MELFLUX 2500L dispersants (BASF), and COATEX Ethacryl M, available from Coatex, Inc.; and/or lignosulfonates or sulfonated lignin. Lignosulfonates are water-soluble anionic polyelectrolyte polymers, byproducts from the production of wood pulp using sulfite pulping. One example of a lignin useful in the practice of principles of embodiments of the present invention is Marasperse C-21 available from Reed Lignin Inc.

Lower molecular weight dispersants are generally preferred. Lower molecular weight naphthalenesulfonate dispersants are favored because they trend to a lower water demand than the higher viscosity, higher molecular weight dispersants. Thus, molecular weights from about 3,000 to about 10,000 (e.g., about 8,000 to about 10,000) are preferred. As another illustration, for PCE211 type dispersants, in some embodiments, the molecular weight can be from about 20,000 to about 60,000, which exhibit less retardation than dispersants having molecular weight above 60,000.

One example of a naphthalenesulfonate is DILOFLO, available from GEO Specialty Chemicals. DILOFLO is a 45% naphthalenesulfonate solution in water, although other aqueous solutions, for example, in the range of about 35% to about 55% by weight solids content, are also readily available. Naphthalenesulfonates can be used in dry solid or powder form, such as LOMAR D, available from GEO Specialty Chemicals, for example. Another exemplary naphthalenesulfonate is DAXAD, available from Hampshire Chemical Corp.

If included, the dispersant can be included in any suitable (solids/solids) amount, such as, for example, about 0.1% to about 5% by weight of the stucco, e.g., about 0.1% to about 4%, about 0.1% to about 3%, about 0.2% to about 3%, about 0.5% to about 3%, about 0.5% to about 2.5%, about 0.5% to about 2%, about 0.5% to about 1.5%, etc.

One or more phosphate-containing compounds can also be optionally included in the slurry, if desired. For example, phosphate-containing components useful in some embodiments include water-soluble components and can be in the form of an ion, a salt, or an acid, namely, condensed phosphoric acids, each of which comprises two or more phosphoric acid units; salts or ions of condensed phosphates, each of which comprises two or more phosphate units; and monobasic salts or monovalent ions of orthophosphates as well as water-soluble acyclic polyphosphate salt. See, e.g., U.S. Pat. Nos. 6,342,284; 6,632,550; 6,815,049; and 6,822,033.

Phosphate-containing components in accordance with some embodiments of the invention can enhance green strength, resistance to permanent deformation (e.g., sag), dimensional stability, etc. Trimetaphosphate compounds can be used, including, for example, sodium trimetaphosphate, potassium trimetaphosphate, lithium trimetaphosphate, and ammonium trimetaphosphate. Sodium trimetaphosphate (STMP) is preferred, although other phosphates may be suitable, including for example sodium tetrametaphosphate, sodium hexametaphosphate having from about 6 to about 27 repeating phosphate units and having the molecular formula $Na_{n+2}PnO_{3n+1}$ wherein n=6-27, tetrapotassium pyrophosphate having the molecular formula $K_4P_2O_7$, trisodium dipotassium tripolyphosphate having the molecular formula $Na_3K_2P_3O_{10}$, sodium tripolyphosphate having the molecular formula $Na_5P_3O_{10}$, tetrasodium pyrophosphate having the molecular formula $Na_4P_2O_7$, aluminum trimetaphosphate having the molecular formula $Al(PO_3)_3$, sodium acid pyrophosphate having the molecular formula $Na_2H_2P_2O_7$, ammonium polyphosphate having 1000-3000 repeating phosphate units and having the molecular formula $(NH_4)_{n+2}P_nO_{3n+1}$ wherein n=1000-3000, or polyphosphoric acid having two or more repeating phosphoric acid units and having the molecular formula $H_{n+2}P_nO_{3n+1}$ wherein n is two or more.

The phosphate can be included in a dry form or in a form in water (e.g., a phosphate solution from about 5% to about 20%, such as about a 10% solution). If included, the phosphate can be in any suitable amount (solids/solids basis), such as from about 0.01% to about 0.5% by weight of the stucco, e.g., from about 0.03% to about 0.4%, from about 0.1% to about 0.3%, or from about 0.12% to about 0.4% by weight of the stucco.

Suitable additives for fire-rated and/or water resistant product can also optionally be included, including e.g., siloxanes (water resistance); fiber; heat sink additives such as aluminum trihydrite (ATH), magnesium hydroxide or the like; and/or high expansion particles (e.g., expandable to about 300% or more of original volume when heated for about one hour at 1560° F.). See, e.g., co-pending, commonly assigned U.S. application Ser. No. 13/400,010 (filed Feb. 17, 2012) for description of these and other ingredients. In some embodiments, high expansion vermiculite is included, although other fire resistant materials can be included. The board of some fire-related product according to the invention can have a Thermal Insulation Index (TI) of about 17 minutes or greater, e.g., about 20 minutes or greater, about 30 minutes or greater, about 45 minutes or greater, about 60 minutes or greater, etc.; and/or a High Temperature Shrinkage (at temperatures of about 1560° F. (850° C.)) of less than about 10% in the x-y directions and expansion in the z-direction of at least about 2%, such as at least about 5%, at least about 10%, at least about 15%, or at least about 20%. The fire or water resistance additives can be included in any suitable amount as desired depending, e.g., on fire rating, etc. For example, if included, the fire or water resistance additives can be in an amount from about 0.5% to about 10% by weight of the stucco, such as from about 1% to about 10%, about 1% to about 8%, about 2% to about 10%, about 2% to about 8% by weight of the stucco, etc.

If included, the siloxane preferably is added in the form of an emulsion. The slurry is then shaped and dried under conditions which promote the polymerization of the siloxane to form a highly cross-linked silicone resin. A catalyst which promotes the polymerization of the siloxane to form a highly cross-linked silicone resin can be added to the gypsum slurry. In some embodiments, solventless methyl hydrogen siloxane fluid sold under the name SILRES BS 94 by Wacker-Chemie GmbH (Munich, Germany) can be used as the siloxane. This product is a siloxane fluid containing no water or solvents. It is contemplated that about 0.3% to about 1.0% of the BS 94 siloxane may be used in some embodiments, based on the weight of the dry ingredients. For example, in some embodiments, it is preferred to use from about 0.4% to about 0.8% of the siloxane based on the dry stucco weight.

The slurry formulation can be made with any suitable water/stucco ratio, e.g., about 0.4 to about 1.3. However, because the uncooked starches having the mid-range viscosity characteristic of the invention reduce the amount of water required to be added to the slurry to accommodate them, as compared with other starches, the slurry can be formulated with a water/stucco ratio input that is lower in some embodiments than what is conventional for other starch-containing gypsum slurries, especially at low weight/density. For example, in some embodiments, the water/stucco ratio can be from about 0.4 to about 1.2, about 0.4 to about 1.1, about 0.4 to about 1, about 0.4 to about 0.9, about 0.4 to about 0.85, about 0.45 to about 0.85, about 0.55 to about 0.85, about 0.55 to about 0.8, about 0.6 to about 0.9, about 0.6 to about 0.85, about 0.6 to about 0.8, etc.

The cover sheets can be formed of any suitable material and basis weight. Advantageously, board core formed from slurry comprising uncooked starch characterized by mid-range viscosity provides sufficient strength in board even with lower basis weight cover sheets such as, for example, less than 45 lbs/MSF (e.g., about 33 lbs/MSF to 45 lbs/MSF) even for lower weight board (e.g., having a density of about 35 pcf or below) in some embodiments. However, if desired, in some embodiments, heavier basis weights can be used, e.g., to further enhance nail pull resistance or to enhance handling, e.g., to facilitate desirable "feel" characteristics for end-users. In some embodiments, to enhance strength (e.g., nail pull strength), especially for lower density board, one or both of the cover sheets can be formed from paper and have a basis weight of, for example, at least about 45 lbs/MSF (e.g., from about 45 lbs/MSF to about 65 lbs/MSF, about 45 lbs/MSF to about 60 lbs/MSF, about 45 lbs/MSF to about 55 lbs/MSF, about 50 lbs/MSF to about 65 lbs/MSF, about 50 lbs/MSF to about 60 lbs/MSF, etc.). If desired, in some embodiments, one cover sheet (e.g., the "face" paper side when installed) can have aforementioned higher basis weight, e.g., to enhance nail pull resistance and handling, while the other cover sheet (e.g., the "back" sheet when the board is installed) can have somewhat lower weight basis if desired (e.g., weight basis of less than 45 lbs/MSF, e.g., from about 33 lbs/MSF to 45 lbs/MSF (e.g., about 33 lbs/MSF to about 40 lbs/MSF).

Board weight is a function of thickness. Since boards are commonly made at varying thickness, board density is used herein as a measure of board weight. The advantages of the uncooked mid-range peak viscosity starch in accordance with embodiments of the invention can be seen across various board densities, e.g., about 40 pcf or less, such as from about 10 pcf to about 40 pcf, from about 12 pcf to about 40 pcf, from about 16 pcf to about 35 pcf, from about 20 pcf to about 40 pcf, from about 24 pcf to about 37 pcf, etc. However, preferred embodiments of the invention have particular utility at lower densities where the enhanced strength provided by the uncooked mid-range viscosity starches of the invention advantageously enable the production of lower weight board with good strength and lower water demand than board made from other starches. For example, in some embodiments, board density can be, e.g.

from about 12 pcf to about 35 pcf, from about 12 pcf to about 30 pcf, from about 12 pcf to about 27 pcf, from about 16 pcf to about 30 pcf, from about 16 pcf to about 27 pcf, from about 16 pcf to about 24 pcf, from about 18 pcf to about 30 pcf, from about 18 pcf to about 27 pcf, from about 20 pcf to about 30 pcf, from about 20 pcf to about 27 pcf, from about 24 pcf to about 35 pcf, from about 27 pcf to about 35 pcf, from about 27 pcf to about 34 pcf, from about 30 pcf to about 34 pcf, about 27 pcf to about 30 pcf, etc.

The uncooked starches having the mid-range viscosity characteristic of the invention provide strength enhancement to product according to the invention, which can be especially beneficial at lower weight/density. For example, in some embodiments, board core or other slurry cast according to the 2 inch cube test (without foam), as described in U.S. Patent Application Publication 2014/0113124, preferably exhibit a compressive strength of at least about 1100 psi, e.g., at least about 1200 psi, at least about 1500 psi, at least about 1900 psi, at least about 1950 psi, at least about 2000 psi, at least about 2050 psi, at least about 2100 psi, at least about 2150 psi, at least about 2200 psi, at least about 2250 psi, at least about 2300 psi, at least about 2350 psi, etc. Such wet compressive strengths are desired to reduce or prevent damage during manufacturing steps prior to drying the board, e.g., in a kiln. In addition, board according to some embodiments of the invention have good wet compressive strength (e.g., better than board formed from a slurry containing pregelatinized starch). For example, in some embodiments, the board can a have wet compression strength of at least about 150 psi (e.g., at least about 170 psi) three minutes after casting begins (e.g., when the slurry is deposited onto paper on a manufacturing line); at least about 460 psi five minutes after casting begins (e.g., at least about 500 psi or at least about 520 psi); greater than 580 psi seven minutes after casting begins; and/or at least about 590 psi ten minutes after casting begins.

In some embodiments, board according to the invention meets test protocols according to ASTM Standard C473-10, method B. For example, in some embodiments, when the board is cast at a thickness of ½ inch, the board has a nail pull resistance of at least about 65 lb as determined according to ASTM C 473, method B (e.g., at least about 68 lb, at least about 70 lb, at least about 72 lb, at least about 75 lb, at least about 77 lb, etc.). With respect to flexural strength, in some embodiments, when cast in a board of ½ inch thickness, the board has a flexural strength of at least about 36 lb in a machine direction (e.g., at least about 38 lb, at least about 40 lb, etc.) and/or at least about 107 lb (e.g., at least about 110 lb, at least about 112 lb, etc.) in a cross-machine direction as determined according to the ASTM standard C473. In addition, in some embodiments, board can have an average core hardness of at least about 11 pounds as determined according to ASTM C-473-10 method B. Due at least in part to the mid-range viscosity characteristic of embodiments of the invention, these standards can be met even with respect to lower density board (e.g., about 35 pcf or less) as described herein.

Product according to embodiments of the invention can be made on typical manufacturing lines. For example, board manufacturing techniques are described in, for example, U.S. Pat. No. 7,364,676 and U.S. Patent Application Publication 2010/0247937. Briefly, in the case of gypsum board, the process typically involves discharging a cover sheet onto a moving conveyor. Since gypsum board is normally formed "face down," this cover sheet is the "face" cover sheet in such embodiments.

Dry and/or wet components of the gypsum slurry are fed to a mixer (e.g., pin mixer), where they are agitated to form the gypsum slurry. The mixer comprises a main body and a discharge conduit (e.g., a gate-canister-boot arrangement as known in the art, or an arrangement as described in U.S. Pat. Nos. 6,494,609 and 6,874,930). In some embodiments, the discharge conduit can include a slurry distributor with either a single feed inlet or multiple feed inlets, such as those described in U.S. Patent Application Publication 2012/0168527 A1 (application Ser. No. 13/341,016) and U.S. Patent Application Publication 2012/0170403 A1 (application Ser. No. 13/341,209), for example. In those embodiments, using a slurry distributor with multiple feed inlets, the discharge conduit can include a suitable flow splitter, such as those described in U.S. Patent Application Publication 2012/0170403 A1. Foaming agent can be added in the discharge conduit of the mixer (e.g., in the gate as described, for example, in U.S. Pat. Nos. 5,683,635 and 6,494,609) or in the main body if desired. Slurry discharged from the discharge conduit after all ingredients have been added, including foaming agent, is the primary gypsum slurry and will form the board core. This board core slurry is discharged onto the moving face cover sheet.

The face cover sheet may bear a thin skim coat in the form of a relatively dense layer of slurry. Also, hard edges, as known in the art, can be formed, e.g., from the same slurry stream forming the face skim coat. In embodiments where foam is inserted into the discharge conduit, a stream of secondary gypsum slurry can be removed from the mixer body to form the dense skim coat slurry, which can then be used to form the face skim coat and hard edges as known in the art. If included, normally the face skim coat and hard edges are deposited onto the moving face cover sheet before the core slurry is deposited, usually upstream of the mixer. After being discharged from the discharge conduit, the core slurry is spread, as necessary, over the face cover sheet (optionally bearing skim coat) and covered with a second cover sheet (typically the "back" cover sheet) to form a wet assembly in the form of a sandwich structure that is a precursor to the final product. The second cover sheet may optionally bear a second skim coat, which can be formed from the same or different secondary (dense) gypsum slurry as for the face skim coat, if present. The cover sheets may be formed from paper, fibrous mat or other type of material (e.g., foil, plastic, glass mat, non-woven material such as blend of cellulosic and inorganic filler, etc.).

The wet assembly thereby provided is conveyed to a forming station where the product is sized to a desired thickness (e.g., via forming plate), and to one or more knife sections where it is cut to a desired length. The wet assembly is allowed to harden to form the interlocking crystalline matrix of set gypsum, and excess water is removed using a drying process (e.g., by transporting the assembly through a kiln). It also is common in the manufacture of gypsum board to use vibration in order to eliminate large voids or air pockets from the deposited slurry. Each of the above steps, as well as processes and equipment for performing such steps, are known in the art.

The uncooked starch characterized by mid-range viscosity of the invention can be used in formulating various products, such as, for example, gypsum wallboard, acoustical (e.g., ceiling) tile, gypsum-cellulosic fiber products, such as gypsum-wood fiber wallboard, and the like. In some embodiments, such product can be formed from slurry according to embodiments of the invention.

As such, the uncooked starch characterized by mid-range viscosity can have beneficial effect, as described herein, in product besides paper-faced gypsum board in embodiments of the invention. For example, uncooked starch characterized as having a mid-range viscosity can be used in mat-faced products (e.g., woven) where board cover sheets are in the form of fibrous mats. The mats can optionally bear a finish to reduce water permeability. Other ingredients that can be included in making such mat-faced product, as well as materials for the fibrous mats and methods of manufacture, are discussed in, e.g., U.S. Pat. No. 8,070,895, as well as U.S. Patent Application Publication 2009/0247937. In addition, gypsum-cellulosic product can be in the form of cellulosic host particles (e.g., wood fibers), gypsum, uncooked starch of mid-range viscosity, and other ingredients (e.g., water resistant additives such as siloxanes) as desired. Other ingredients and methods of manufacture are discussed in, e.g., U.S. Pat. Nos. 4,328,178; 4,239,716; 4,392,896; 4,645,548; 5,320,677; 5,817,262; and 7,413,603.

The uncooked starch characterized by mid-range viscosity according to embodiments of the invention also can be used in various types of acoustical panels (e.g., ceiling tile). The starch can be mixed with calcined gypsum, water, and other ingredients as desired in some embodiments. However, the uncooked starch of mid-range viscosity in accordance with some embodiments is not limited to use with calcined gypsum. The uncooked starch of mid-range viscosity in accordance with some embodiments can provide good bond between starch and non-setting components such as fibers (e.g., mineral wool and the like). In some embodiments, the panel has a Noise Reduction Coefficient of at least about 0.5 (e.g., at least about 0.7 or at least about 1) according to ASTM C 423-02. See, e.g., U.S. Pat. Nos. 1,769,519; 6,443,258; 7,364,015; 7,851,057; and 7,862,687 for discussion of ingredients and methods for making acoustical tile.

The invention is further illustrated by the following exemplary embodiments. However, the invention is not limited by the following embodiments.

(1) A gypsum board, slurry, or method for making gypsum board as described herein.

(2) A gypsum board comprising: a set gypsum core disposed between two cover sheets, the core formed from a slurry comprising stucco, water, and at least one uncooked starch having a peak viscosity of from about 120 Brabender Units to about 900 Brabender Units when the viscosity is measured by putting the starch in a slurry with water at a starch concentration of 15% solids, and using a Viscograph-E instrument set at 75 rpm and 700 cmg, where the starch is heated from 25° C. to 95° C. at a rate of 3° C./minute, the slurry is held at 95° C. for ten minutes, and the starch is cooled to 50° C. at a rate of −3° C./minute.

(3) The gypsum board of embodiment 2, wherein the uncooked starch has a bulk density of from about 41 pcf to about 45 pcf.

(4) The gypsum board of any one of embodiments 2-3, wherein the uncooked starch has a peak viscosity of from about 120 BU to about 875 BU.

(5) The gypsum board of embodiment 4, wherein the uncooked starch has a peak viscosity of from about 300 BU to about 875 BU.

(6) The gypsum board of embodiment 5, wherein the uncooked starch has a peak viscosity of from about 400 BU to about 875 BU.

(7) The gypsum board of any one of embodiments 2-6, wherein the uncooked starch is acid-modified.

(8) The gypsum board of any one of embodiment 2-7, wherein the uncooked starch has a cold water viscosity of less than about 50 centipoise, as measured according to Brookfield viscometer method.

(9) The gypsum board of embodiment 8, wherein the uncooked starch has a cold water viscosity of about 1 centipoise to about 40 centipoise.

(10) The gypsum board of embodiment 8, wherein the uncooked starch has a cold water viscosity of about 1 centipoise to about 20 centipoise.

(11) The gypsum board of any one of embodiments 1-10, wherein the slurry further comprises a dispersant.

(12) The gypsum board of embodiment 11, wherein the dispersant is naphthalene sulfonate.

(13) The gypsum board of embodiments 11 or 12, wherein the dispersant is present in an amount of from about 0.1 to about 4% by weight of the stucco.

(14) The gypsum board of any one of embodiments 1-13, wherein the slurry further comprises a polyphosphate.

(15) The gypsum board of embodiment 14, wherein the polyphosphate is sodium trimetaphosphate.

(16) The gypsum board of embodiments 14 or 15, wherein the polyphosphate is present in an amount of from about 0.1 to about 0.3% by weight of the stucco.

(17) The gypsum board of any one of embodiments 1-16, wherein the board has a density of from about 16 pcf to about 35 pcf.

(18) The gypsum board of embodiment 17, wherein the board has a density of from about 20 pcf to about 31 pcf.

(19) The gypsum board of any one of embodiments 1-18, wherein the board has a nail pull resistance of at least about 72 lb-f according to ASTM 473-10, method B.

(20) A gypsum board comprising: a set gypsum core disposed between two cover sheets, the core formed from a slurry comprising stucco, water, and at least one uncooked starch having a cold water viscosity at 10% of solids of from about 5 centipoise to about 50 centipoise when the viscosity is measured by a Brookfield viscometer method at 25° C.

(21) The gypsum board of embodiment 20, wherein the uncooked starch has a bulk density of from about 41 pcf to about 45 pcf.

(22) The gypsum board of either of embodiments 20 or 21, wherein the uncooked starch has a peak viscosity of from about 120 BU to about 900 BU.

(23) The gypsum board of embodiment 22, wherein the uncooked starch has a viscosity of from about 300 BU to about 875 BU.

(24) The gypsum board of embodiment 23, wherein the uncooked starch has a viscosity of from about 400 BU to about 875 BU.

(25) The gypsum board of any one of embodiments 20-24, wherein the uncooked starch is acid-modified.

(26) The gypsum board of any one of embodiments 20-25, wherein the uncooked starch has a cold water viscosity of less than about 50 centipoise, as measured according to a Brookfield viscometer method.

(27) The gypsum board of embodiment 26, wherein the uncooked starch has a cold water viscosity of about 1 centipoise to about 40 centipoise.

(28) The gypsum board of embodiment 27, wherein the uncooked starch has a cold water viscosity of about 1 centipoise to about 20 centipoise.

(29) The gypsum board of any one of embodiments 20-28, wherein the slurry further comprises a dispersant.

(30) The gypsum board of embodiment 29, wherein the dispersant is naphthalene sulfonate.

(31) The gypsum board of embodiments 29 or 30, wherein the dispersant is present in an amount of from about 0.1 to about 5% by weight of the stucco.

(32) The gypsum board of any one of embodiments 20-31, wherein the slurry further comprises a polyphosphate.

(33) The gypsum board of embodiment 32, wherein the polyphosphate is sodium trimetaphosphate.

(34) The gypsum board of embodiments 32 or 33, wherein the polyphosphate is present in an amount of from about 0.1% to about 0.3% by weight of the stucco.

(35) The gypsum board of any one of embodiments 20-34, wherein the board has a density of from about 16 pcf to about 35 pcf.

(36) The gypsum board of embodiments 35, wherein the board has a density of from about 20 pcf to about 31 pcf.

(37) The gypsum board of any one of embodiments 20-36, wherein the board has a nail pull resistance of at least about 72 lb-f according to ASTM 473-10, method B.

(38) A slurry comprising stucco, water, and at least one uncooked starch having a peak viscosity of from about 120 Brabender Units to about 900 Brabender Units when the viscosity is measured by putting the starch in a slurry with water at a starch concentration of 15% solids, and using a Viscograph-E instrument set at 75 rpm and 700 cmg, where the starch is heated from 25° C. to 95° C. at a rate of 3° C./minute, the slurry is held at 95° C. for ten minutes, and the starch is cooled to 50° C. at a rate of −3° C./minute.

(39) A slurry comprising stucco, water, and at least one uncooked starch having a cold water viscosity of from about 5 centipoise to about 50 centipoise when the viscosity is measured by a Brookfield viscometer method at 25° C.

(40) The slurry of either of embodiments 38 or 39, wherein the uncooked starch has a bulk density of from about 41 pcf to about 45 pcf.

(41) The slurry of any one of embodiments 38-40, wherein the uncooked starch has a peak viscosity of from about 120 BU to about 875 BU.

(42) The slurry of embodiment 41, wherein the uncooked starch has a viscosity of from about 300 BU to about 875 BU.

(43) The slurry of embodiment 42, wherein the uncooked starch has a viscosity of from about 400 BU to about 875 BU.

(44) The slurry of any one of embodiments 38-43, wherein the uncooked starch is acid-modified.

(45) The slurry of embodiment 38, wherein the uncooked starch has a cold water viscosity of less than about 50 centipoise, as measured according to a Brookfield viscometer method.

(46) The slurry of any one of embodiments 38-45, wherein the uncooked starch has a cold water viscosity of about 1 centipoise to about 40 centipoise.

(47) The slurry of claim 46, wherein the uncooked starch has a cold water viscosity of about 1 centipoise to about 20 centipoise.

(48) The slurry of any one of embodiments 38-47, wherein the slurry further comprises a dispersant.

(49) The slurry of embodiment 48, wherein the dispersant is naphthalene sulfonate.

(50) The slurry of embodiments 48 or 49, wherein the dispersant is present in an amount of from about 0.1% to about 5% by weight of the stucco.

(51) The slurry of any one of embodiments 38-50, wherein the slurry further comprises a polyphosphate.

(52) The slurry of embodiment 51, wherein the polyphosphate is sodium trimetaphosphate.

(53) The slurry of embodiments 51 or 52, wherein the polyphosphate is present in an amount of from about 0.1% to about 0.3% by weight of the stucco.

(54) The slurry of any one of embodiments 38-53, the slurry having a water-stucco ratio of from about 0.4 to about 1.2.

(55) The slurry of any one of embodiments 38-54, wherein, when the slurry is prepared into a board, the board has a density of from about 16 pcf to about 35 pcf and a nail pull resistance of at least about 65 lb-f according to ASTM 473-10, method B.

(56) A product made from the slurry of any of embodiments 38-55.

(57) A method of preparing gypsum board comprising: (a) mixing a slurry of any one of embodiments 38-56; (b) disposing the slurry between a first cover sheet and a second cover sheet to form a wet assembly; (c) cutting the wet assembly into a board; and (d) drying the board.

(58) An acoustical panel comprising an acoustical component comprising fiber and at least one uncooked starch having a peak viscosity of from about 120 Brabender Units to about 900 Brabender Units when the viscosity is measured by putting the starch in a slurry with water at a starch concentration of 15% solids, and using a Viscograph-E instrument set at 75 rpm and 700 cmg, where the starch is heated from 25° C. to 95° C. at a rate of 3° C./minute, the slurry is held at 95° C. for ten minutes, and the starch is cooled to 50° C. at a rate of −3° C./minute, and wherein the panel has a Noise Reduction Coefficient of at least about 0.5 according to ASTM C 423-02.

(59) The acoustical panel according to embodiment 58, wherein the fibers comprise mineral wool.

It shall be noted that the preceding are merely examples of embodiments. Other exemplary embodiments are apparent from the entirety of the description herein. It will also be understood by one of ordinary skill in the art that each of these embodiments may be used in various combinations with the other embodiments provided herein.

The following examples further illustrate the invention but, of course, should not be construed as in any way limiting its scope.

Example 1

Table 1 compares the cold water viscosity of uncooked starches A and B (Clinton 277 and Clinton 260, respectively) and pregelatinized starches A and B. Pregelatinized starch A is a pregelatinized corn starch having a viscosity of 773 centipoise according to the VMA method, and pregelatinized starch B is a pregelatinized corn starch having a viscosity of 100 centipoise according to the VMA method.

TABLE 1

Brookfield viscosity of a 10% of starch slurries at 25° C.

| Starch | Viscosity (Centipoise) |
| --- | --- |
| Pregelatinized corn starch A | 396 |
| Pregelatinized corn starch B | 92 |
| Uncooked acid-modified corn starch A (Clinton 277) | 9.5 |
| Uncooked acid-modified corn starch B (Clinton 260) | 9.3 |

Table 2 shows the peak viscosity of uncooked acid-modified corn starches A-C.

TABLE 2

Brabender peak viscosity of a 15% of starch slurries

| Type of Starch | Product Name | Peak Viscosity (BU) |
| --- | --- | --- |
| Uncooked acid-modified corn starch A | Clinton 277 | 141 |
| Uncooked acid-modified corn starch B | Clinton 260 | 451 |
| Uncooked acid-modified corn starch C | Clinton 240 | 872 |

Table 3 shows the composition of no-foam gypsum disk samples. The retarder was in the form of a 1% solution of the pentasodium salt of diethylenetriaminepentaacetic acid (Versenex™ 80, commercially available from DOW Chemical Company, Midland, Mich.). The dispersant was in the form of polynaphthalene sulfonate (DILOFLO, commercially available from GEO Specialty Chemicals, Amber, Pa.). The disk sample was wrapped in an aluminum foil and heated at 350° F. for 22 min, then was dried at 1100F overnight.

TABLE 3

Composition of no-foam gypsum disk samples

| | Composition A (comparative) | Composition B | Composition C |
| --- | --- | --- | --- |
| Stucco | 300 g | 300 g | 300 g |
| Heat Resistant Accelerator | 3 g | 3 g | 3 g |
| Starch | 6 g (pregelatinized corn starch A) | 6 g (Uncooked acid-modified corn starch C, Clinton 240) | 6 g (Uncooked acid-modified corn starch A, Clinton 277) |
| Sodium trimetaphosphate | 0.6 g | 0.6 g | 0.6 g |
| Retarder | 0.15 g | 0.15 g | 0.15 g |
| Dispersant | 1.5 g | 1.5 g | 1.5 g |
| Water | 448.5 g | 448.5 g | 448.5 g |

Table 4 shows compressive strength of no-foam gypsum samples with uncooked acid-modified corn starches C and A (Clinton 240 and Clinton 277, respectively) and pregelatinized corn starch A (comparative).

TABLE 4

Compressive strength of no-foam gypsum disk samples at a density of 39 pcf

| | Compressive strength (psi) |
| --- | --- |
| Composition A | 1018 |
| Composition B | 1218 |
| Composition C | 1157 |

Table 5 shows the composition of foamed gypsum disk samples. Foam was added to bring the final density to 30 pcf. The retarder was in the form of a 1% solution of the pentasodium salt of diethylenetriaminepentaacetic acid (Versenex™ 80). The dispersant was in the form of polynaphthalene sulfonate (DILOFLO). The slurry was poured into a 1 foot×1 foot paper envelope and heated at 350° F. for 22 min, then was dried at 1100F overnight.

TABLE 5

Composition of foamed gypsum disk samples

| | Composition D (Comparative) | Composition E |
| --- | --- | --- |
| Stucco | 600 g | 600 g |
| Heat Resistant Accelerator | 6 g | 6 g |
| Starch | 12 g (pregelatinized corn starch A) | 12 g (Uncooked acid-modified corn starch C, Clinton 240) |
| Sodium trimetaphosphate | 1.2 g | 1.2 g |
| Retarder | 0.15 g | 0.15 g |
| Dispersant | 3 g | 3 g |
| Water | 512 g | 481 g |

Table 6 shows compressive strength and nail pull strength of foamed gypsum samples with uncooked acid-modified corn starch C (Clinton 240) as compared with pregelatinized starch A.

TABLE 6

Compressive strength and nail pull strength of foamed gypsum disk samples

| | Density (pcf) | Compressive strength (psi) | Nail pull strength (lbs) |
| --- | --- | --- | --- |
| Composition D | 30.1 | 357 | 68.5 |
| Composition E | 30.6 | 421 | 78.1 |

As seen in Tables 4 and 6, the strength provided by the uncooked starches was higher than that of pregelatinized starches.

Example 2

This Example illustrates the wet strength of a set gypsum composition formed from a slurry containing an uncooked starch, as compared with two other set gypsum compositions formed from slurries containing pregelatinized starches. The wet strength was measured before the composition entered a kiln for drying. The wet strength of a gypsum board affects, e.g., how well the wet gypsum board is cut, and how well the wet gypsum board is flipped and transported from a knife to a kiln on a wallboard manufacturing line.

In particular, the wet strength was measured by a compressive strength test. The formulation for preparing the set gypsum compositions is listed in Table 7 with the only difference between the three compositions being the selection of the starch. One composition contained uncooked, acid modified corn starch B (i.e., Clinton 260) as compared with the other two compositions formed from pregelatinized corn starch A and B, respectively, where the starches are set forth in Tables 1 and 2.

TABLE 7

Formulation of gypsum slurry for wet strength test

| Ingredient | Weight (g) | Weight (% by weight of stucco) |
| --- | --- | --- |
| Stucco | 500 | 100 |
| Heat Resistant Accelerator | 5 | 1 |
| Starch | 8 | 1.6 |
| Sodium trimetaphosphate (10% solution) | 5 | 0.1 |
| PNS | 2.5 | 0.5 |
| Water | 542.5 | 108.5 |

The dry ingredients were mixed and added into the liquid ingredients. The mixture was soaked for 10 seconds, and mixed for 10 seconds in a Waring blender (model CB15N). The slurry was poured into a ring with a diameter of 4 inches and a thickness of ⅝ inch. The wet compressive strength of the set gypsum disks was measured at 3, 5, 7, and 10 minutes after the dry ingredients were mixed with the liquid ingredients. The results are provided in FIG. 2.

Figure 1:
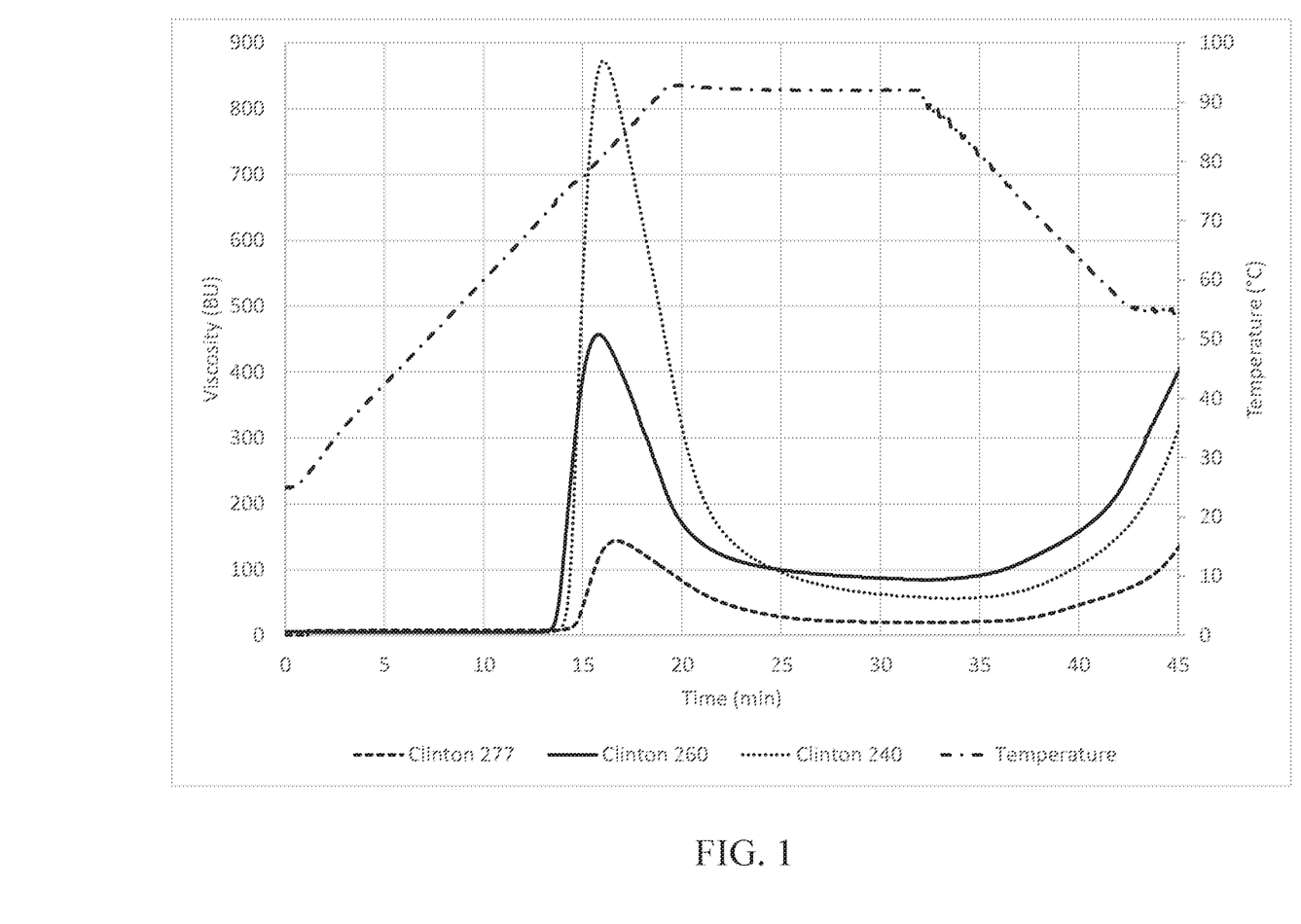
FIG. 1 is a Brabender amylogram of slurries of 15% starch in water, illustrating the viscosity of starch, where the X-axis is time and the Y-axis superimposes viscosity (primary Y-axis, on the left) and temperature (secondary Y-axis, on the right), in accordance with embodiments of the invention.
Figure 2:
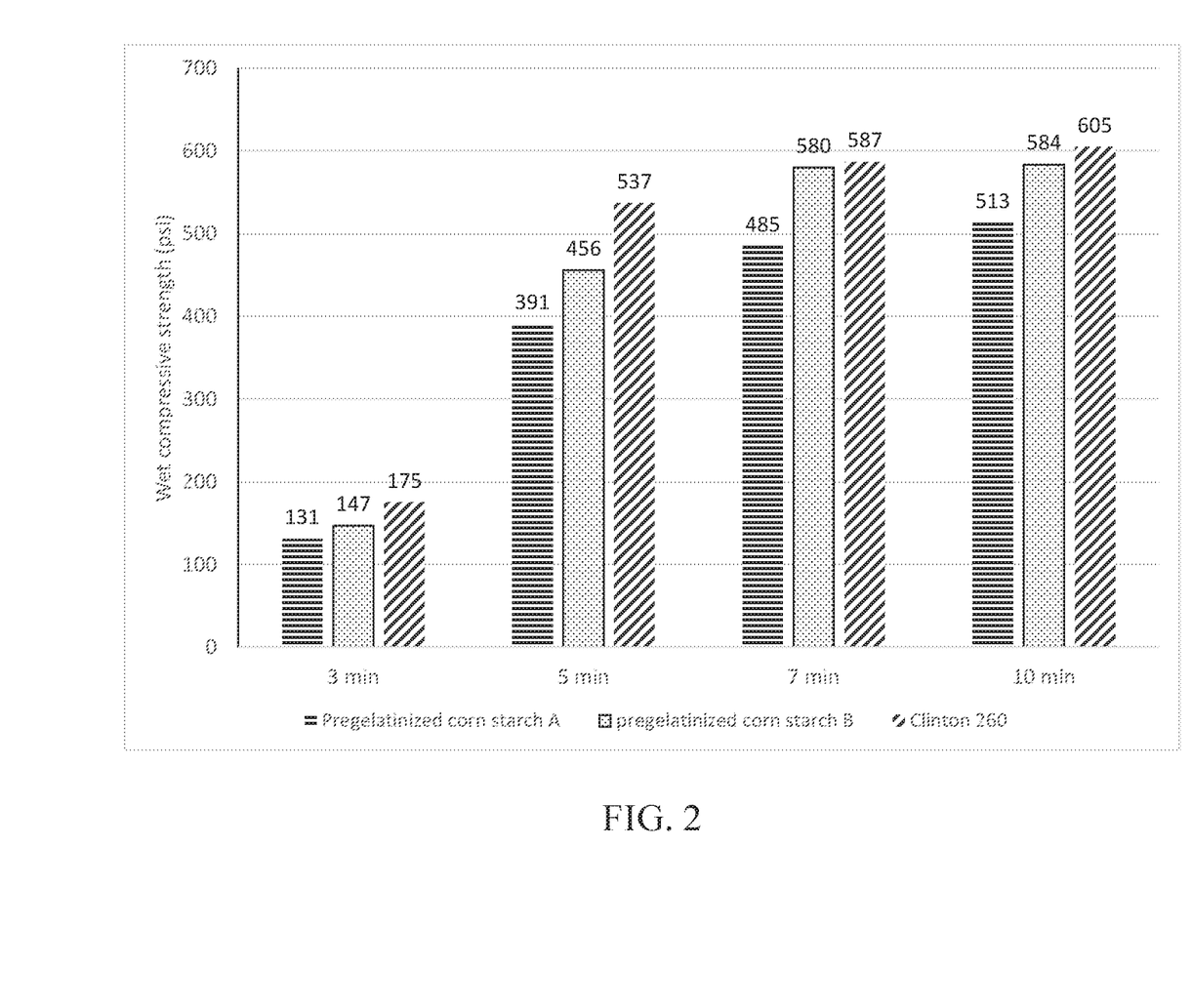
FIG. 2 is a bar graph of the wet compressive strength of a set gypsum composition formed from slurry containing uncooked acid-modified corn starch B, as compared with set gypsum compositions formed from slurries containing pregelatinized corn starches A and B, respectively, at intervals of three, five, seven, and ten minutes, as described in Example 2.

Surprisingly, as seen in FIG. 2, the sample containing uncooked acid-modified corn starch B (Clinton 260) had stronger wet strength than the samples containing pregelatinized corn starches A and B at all time intervals.

Example 3

This Example demonstrates the drying rate of wet boards formed from a slurry containing an uncooked starch as compared with the boards formed from a slurry containing a pregelatinized corn starch. In this respect, the drying rate can affect the board manufacturing process, including parameters such as energy usage, line speed, paper-core bond, end burn, kiln jam, etc.

In particular, two one foot by one foot gypsum boards were made according to the formulation listed in Table 8, with the only difference between the two board formulations being the type of starch included in the slurry. One board was formed from an uncooked acid-modified corn starch B, as shown in Tables 1 and 2, which was compared with the other board, formed from pregelatinized corn starch B as described in Table 1.

TABLE 8

Formulation of gypsum slurry

| Ingredients | Weight (g) | Weight (% by weight of stucco) |
| --- | --- | --- |
| Stucco | 700 | 100 |
| Heat Resistant Accelerator | 7 | 1 |
| Starch | 14 | 2 |
| Sodium Trimetaphosphate (10% solution) | 14 | 0.2 |
| PNS | 3.5 | 0.5 |
| Retarder (1% solution) | 25 | 0.036 |
| Gauging water | 600 | 85.7 |

"PNS" refers to polynaphthalene sulfonate (DILOFLO). The retarder was in the form of a 1% solution of the pentasodium salt of diethylenetriaminepentaacetic acid (Versenex™ 80). "Gauging" water refers to the water mixed with the dry ingredients. Dry ingredients (stucco, heat resistant accelerator, starch) were mixed and added into liquid ingredients (sodium trimetaphosphate 10% solution, dispersant, 1% retarder solution, and water). The mixture was soaked for 10 seconds, and mixed at speed 2 of a Hobart mixer (model N50) for 25 seconds. Air bubbles were made by mixing air and a 0.5% of a soap mixture (stable soap: unstable soap=1:1). The flow rate of air was 5 L/min and the flow rate of the soap solution was 25 lbs/hr. A dry core density of 31 pcf was reached after 15 seconds of foaming. The foamed slurry was poured between a face paper (Manila) and a back paper (Newsline). The thickness of the board was 0.5 inch. The set board was dried at 450° F. for 17 min. The weight of the boards over time is reported in FIG. 3.

Figure 3:
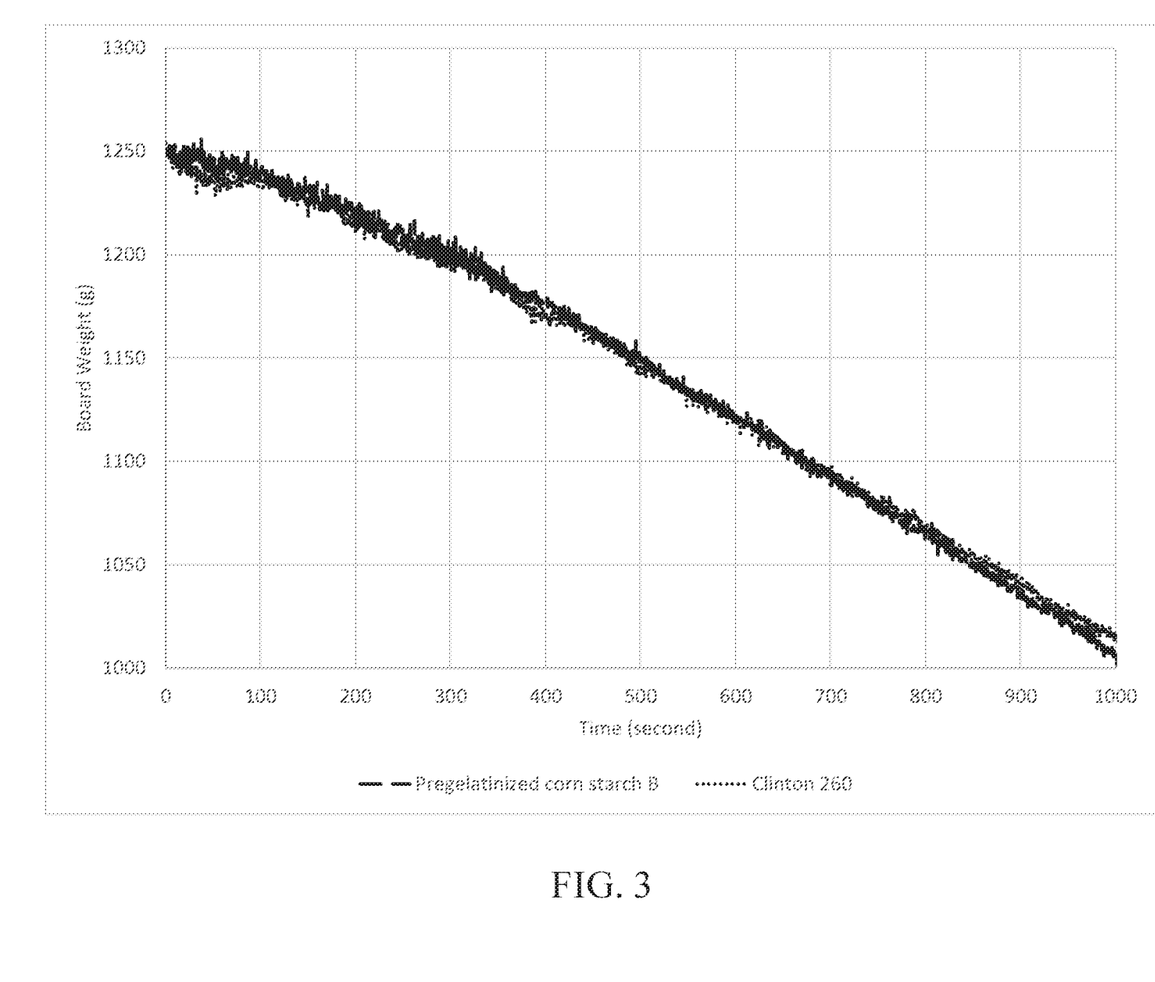
FIG. 3 is a graph of the drying rate (weight vs. time) at 450° F. of board formed from a slurry containing uncooked starch compared to board formed from a slurry containing pregelatinized corn starch B, as described in Example 3.

As seen in FIG. 3, uncooked starch (acid-modified corn starch B, i.e., Clinton 260) had a similar drying rate as the pregelatinized corn starch B, despite heat being used to gelatinize the uncooked starch in situ. No difference in drying rate of the boards made from these two starches was observed.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A gypsum board comprising:
a set gypsum core disposed between two cover sheets, the core formed from a slurry comprising stucco, water, and at least one uncooked non-substituted starch having a peak viscosity of from about 120 Brabender Units to about 900 Brabender Units when the viscosity is measured by putting the starch in a slurry with water at a starch concentration of 15% solids, and using a VISCOGRAPH®-E instrument set at 75 rpm and 700 cmg, where the starch is heated from 25° C. to 95° C. at a rate of 3° C./minute, the slurry is held at 95° C. for ten minutes, and the starch is cooled to 50° C. at a rate of −3° C./minute.

2. The gypsum board of claim 1, wherein the uncooked non-substituted starch has a bulk density of from about 40 pcf to about 45 pcf.

3. The gypsum board of claim 1, wherein the uncooked non-substituted starch has a peak viscosity of from about 300 BU to about 875 BU.

4. The gypsum board of claim 1, wherein the uncooked non-substituted starch is acid-modified.

5. The gypsum board of claim 1, wherein the uncooked non-substituted starch has a cold water viscosity of less than about 50 centipoise, as measured according to the BROOKFIELD® viscometer method.

6. The gypsum board of claim 1, wherein the slurry further comprises a dispersant.

7. The gypsum board of claim 1, wherein the slurry further comprises a polyphosphate.

8. The gypsum board of claim 7, wherein the polyphosphate is sodium trimetaphosphate, and the slurry further comprises a dispersant.

9. The gypsum board of claim 1, wherein the uncooked non-substituted starch has a bulk density of from about 35 pcf to about 45 pcf, the uncooked non-substituted starch is acid-modified, the uncooked non-substituted starch has a cold water viscosity of less than about 50 centipoise, as measured according to the BROOKFIELD® viscometer method, and the board has a density of from about 16 pcf to about 35 pcf.

10. The gypsum board of claim 9, wherein the board has a nail pull resistance of at least about 72 lb-f according to ASTM 473-10, method B.

11. A gypsum board comprising:
a set gypsum core disposed between two cover sheets, the core formed from a slurry comprising stucco, water, and at least one uncooked non-substituted starch having a cold water viscosity at 10% of solids of from about 5 centipoise to about 50 centipoise when the viscosity is measured by a BROOKFIELD® viscometer method at 25° C.

12. The gypsum board of claim 11, wherein the uncooked non-substituted starch has a viscosity of from about 300 BU to about 875 BU when the viscosity is measured by putting the starch in a slurry with water at a starch concentration of 15% solids, and using a VISCOGRAPH® instrument set at 75 rpm and 700 cmg, where the starch is heated from 25° C. to 95° C. at a rate of 3° C./minute, the slurry is held at 95° C. for ten minutes, and the starch is cooled to 50° C. at a rate of −3° C./minute.

13. The gypsum board of claim 11, wherein the uncooked non-substituted starch has a cold water viscosity of about 1 centipoise to about 20 centipoise, the uncooked non-substituted starch is acid-modified, and the board has a density of from about 16 pcf to about 35 pcf.

* * * * *